July 6, 1937. E. D. BROWNING 2,086,254
TRIMMING APPARATUS
Filed Jan. 26, 1934 2 Sheets-Sheet 1
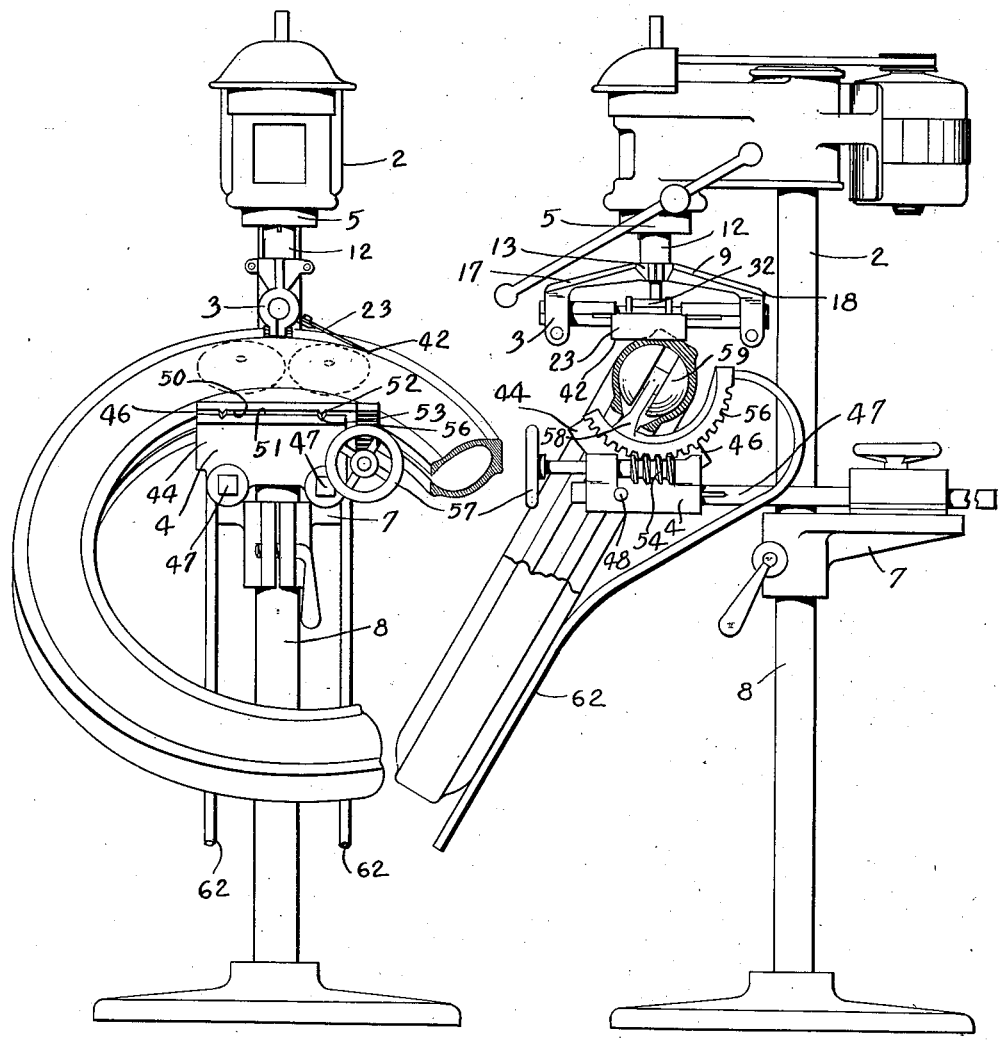
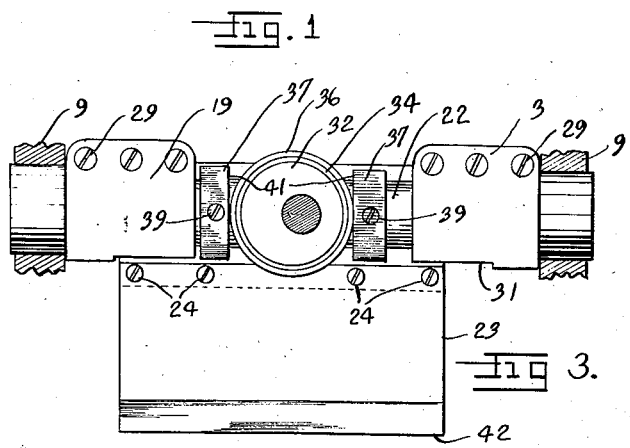
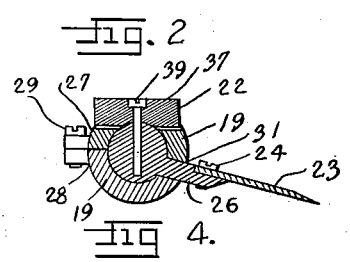
INVENTOR.
EDWIN D. BROWNING
BY Joseph B. Gardner
ATTORNEY.

July 6, 1937.  E. D. BROWNING  2,086,254
TRIMMING APPARATUS
Filed Jan. 26, 1934  2 Sheets-Sheet 2
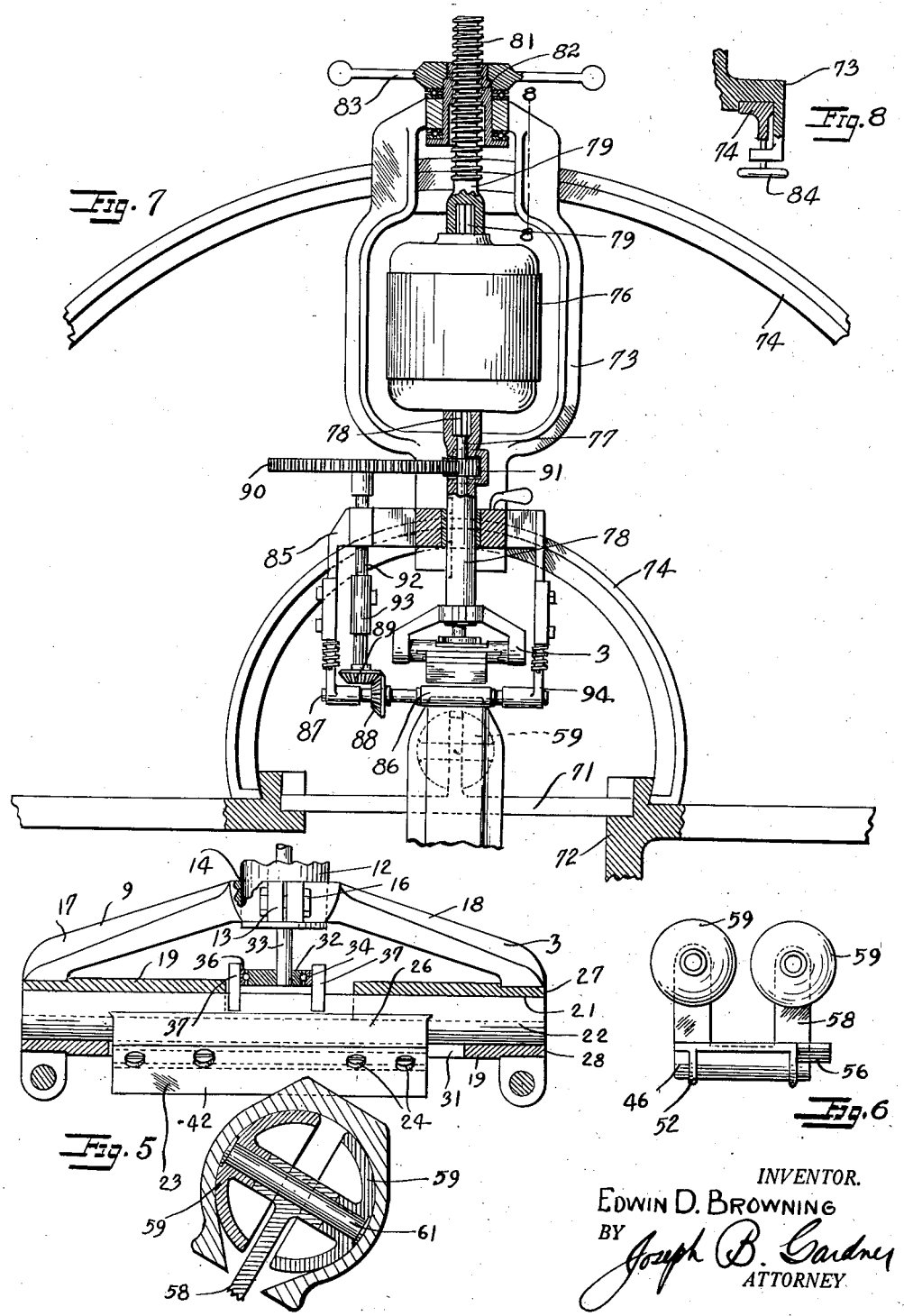
INVENTOR.
EDWIN D. BROWNING
BY Joseph B. Gardner
ATTORNEY Patented July 6, 1937

2,086,254

UNITED STATES PATENT OFFICE 2,086,254

TRIMMING APPARATUS

Edwin D. Browning, Alameda, Calif.

Application January 26, 1934, Serial No. 708,423

6 Claims. (Cl. 164—49)

The invention relates to a trimming or cutting apparatus for removing by shaving or paring, portions of a piece of work, particularly of cylindrical or like form, so as to leave a transversely curved or other shaped surface for the full or any portion of the width and periphery of the work. Such apparatus is well adapted for use in removing the tread of a rubber tire in preparing the latter for retreading by vulcanization, and in the present embodiment the objects and features of the apparatus are brought out in the application of the apparatus to such tire use. It will be understood, therefore, that the apparatus is usable for other purposes.

One of the objects of the invention is to provide a device of the character described, by which such as in the case of a tire, the desired amount of material may be removed from the tread uniformly and evenly across the full width thereof and completely around the circumference of the tire, with very little effort or skill required on the part of the operator.

Another of the objects of the invention is to provide an apparatus of the character described, which may be motivated with the expenditure of comparatively little power, and may be operated for a considerable period without requiring change of the cutting element.

A further object of the invention is to provide an apparatus of the character described by which the tread removing operation may be performed on the tire without requiring the latter to be mounted on its rim or be in inflated state during said operation.

An additional object of the invention is to provide a means of the character described, which will serve to firmly support the tire for cutting, and yet will permit the operator to easily move the tire for successively presenting the different portions of the tire for cutting.

A still further object of the invention is to provide a trimmer of the character described which may be designed in the form of an attachment for machines used as common shop equipment.

Yet another object of the invention is to provide a trimmer apparatus of the character described, which can be designed to afford complete removal of the tire tread and leave the tire in condition for retreading, without requiring shifting of the angular relation of the tire in the machine at any time.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of the apparatus of my invention, with a tire operatively positioned therein.

Figure 2 is a view similar to Figure 1, but taken at right angles thereto.

Figure 3 is a horizontal sectional view of the cutter head taken on the line 3—3 of Figure 1.

Figure 4 is a vertical sectional view of a portion of the cutter head.

Figure 5 is a fragmentary side view of the cutter head as shown in Figure 1, but on an enlarged scale partly in section.

Figure 6 is a detail front view of the work supporting unit.

Figure 7 is a side view of a modified form of the apparatus, parts being broken away and shown in section.

Figure 8 is a fragmentary sectional view of the trimmer frame taken on the line 8—8 of Figure 7.

The trimmer in the embodiment of the invention illustrated in Figures 1 to 5 inclusive is designed as an attachment and is shown operatively associated with a motivating and supporting unit such as a vertical drill press 2. The unit, particularly when a drill press, need not be of any special design or form but may be one of any of the many existing types available.

In general, it may be stated that the device of my invention in its preferred form, comprises two parts, to wit, a cutter head 3, and a work supporting unit 4. The cutter head, as will probably be most clear from Figure 2, is arranged for attachment to the vertically adjustable drill head 5 of the drill apparatus, while the work supporting unit is designed for mounting on the correspondingly and horizontally adjustable table 7 of the drill standard 8.

Specifically, the cutter head as here shown comprises a holder 9 arranged to be clamped to the quill or spindle casing 12 of the drill press, and having for the purpose a clamping portion 13 which defines an opening 14 for the reception of said quill and in which the latter may be securely held by a clamping screw 16. Mounted in clamping portions 17 and 18 provided at transversely spaced ends of the holder is a bearing or guide member 19 having a bore 21 which extends at right angles to the axis of the opening 14 so that in the operative position of the cutter head the axis of the bore will be horizontally disposed. Slidably fitted in said bore is a reciprocatable shaft 22 which forms the holder proper for the cutter element here shown such as a blade 23. By reference to Figure 4 it will be seen that the blade is removably secured to the shaft 22, and attachment is effected by means of screws 24 which fasten the blade to a radial extension 26 formed on the shaft. To permit assembly of the shaft with the extension in the guide member 19, the latter is formed of transversely separable segments 27 and 28 which are secured together by screws 29 and define an opening 31 to accommodate the extension. Since the inter-engaging surfaces of the guide member and holder are cylindrical, the former may be clamped in the latter in different positions and therefore the angular positioning of the blade may be adjustable as desired.

For effecting the operative movement of the shaft 22, I provide means for translating the rotary motion afforded by the drill apparatus to reciprocating motion of said shaft. This means includes an eccentric 32 suitably keyed or otherwise fixedly attached to the member 33 of the drill apparatus, generally termed the spindle, said eccentric being preferably positioned at the extremity of the spindle and in underlying relation to the clamping portion 13 which engages the quill. Surrounding the eccentric and preferably spaced therefrom by a ball race 34 is a strap or ring 36 designed for contact with points on or relatively fixed with respect to the shaft. As here shown the latter is provided with lugs 37 which are secured to the shaft by means of screws 39 and provide opposed longitudinally spaced bearing faces 41 with which the periphery of the ring 36 is designed to have rolling contact. In order to afford greater compactness in design, and more direct application of the forces, the segment 27 is formed of longitudinally spaced sections so that the eccentric may be set close against the shaft. It will be clear that on rotation of the spindle, the eccentric through the ring 36, will alternately press against the different faces 41 and thereby cause the reciprocation of the shaft and likewise the blade 23. The blade is preferably positioned with its cutting edge 42 parallel to the axis of the shaft, and as a result thereof the cutting line will correspond to the direction of movement of the blade. Vertical adjustment of the blade with the whole cutter head may be effected by regulating the height of the spindle and quill, and in the same way variation in the position of the cutting edge of the blade about the vertical axis of the drill head may be effected by shifting the holder about the quill or turning the quill about its axis.

The work supporting unit 4, in the present embodiment, is of a design rendering it particularly adapted for supporting a tire for movement in operative relation to the cutter so that the tread may be removed thereby. This unit, as before explained, is here shown as mounted on the table 7 carried by the drill press standard, such mounting being of a nature which will permit the table, and consequently the unit as a whole, to be adjusted vertically. Specifically, the unit is in the form of a trunnion 44 mounted for rotation in a journal 46 which is anchored in a suitable manner to the table. As illustrated in the drawings, the journal 46 is carried on a track 47, and such track is adjustable horizontally with respect to the table. If desired, horizontal adjustment of the journal may also be secured by sliding the same on the tracks, the journal being clamped in position by a screw 48. With adjustment of the journal thus afforded independently of the drill apparatus, the unit may be used with apparatus not necessarily affording the adjustment of the table or drill head.

Engagement of the trunnion and journal is through cooperating arcuate bearing faces 50 and 51 on the respective parts, and axial displacement of the one part with respect to the other is prevented in any suitable manner, such as by engagement of the trunnion 52 in grooves 53 of the journal. Rotation of the trunnion in the journal and retention of the former in the latter in any desired adjusted position is afforded through means of a worm wheel 54 carried on the journal and meshing with a segmental gear wheel 56 fixed to the trunnion in concentric relation therewith. A handwheel 57 fixed to the worm 54 provides a convenient means of turning the same.

The trunnion includes as part thereof a body portion or frame 58 on which are mounted ball-rollers 59 with an axis coincident with that of the trunnion. The balls are of a size to permit of their insertion within the tire casing and engage the interior walls of the latter as shown in Figure 2. Rotation of the balls is about pivot pins 61 whose axes lie at right angles to the trunnion axis. In this manner the tire when positioned on the balls, may be supported thereby to revolve with its own axis parallel to that of the axis of rotation of the balls. In order to insure maximum bearing and supporting surface between the rollers and the inner side of the tire casing, the balls are formed of half-portions, one on each side of the frame 58. Any number of rollers may be mounted on the trunnion to engage and support the tire, but it has been found that a pair in slightly spaced relation with each practically equidistant from the vertical center line of the drill head is quite satisfactory. Furthermore it is desirable that the top of one of the rollers be disposed in approximate vertical alignment with the cutting edge of the blade, as in this way the portion of the tire being operated on by the blade will have a firm backing, and a smooth and uniform cut will be effected. For assisting in the support of the tire, particularly when the latter is disposed with its axis out of the horizontal, there are secured to the trunnion one or more arms 62 which extend down under the trunnion journal in position to engage a side of the tire near the bottom when the tire is operatively mounted on the rollers.

In using the apparatus for removing a tire tread, ordinarily the tire is first mounted on the rollers and the trunnion is moved to place the tire in oblique position such as indicated in Figure 2. Then with the cutter head brought into position over the tire, the motive power is actuated to effect reciprocation of the blade and the head lowered to bring the knife in cutting relation to the tread. At this time the operator advances the tire over the rollers and continues to do so until an edge portion of the tread has been removed from the tire to the desired depth completely around the periphery of the tire. The trunnion is then moved to place the tire in a more upright position so that a cut closer to the center of the tread may be effected. After the second cut is made, the trunnion is moved to permit a further inward cut and so on until the tire has been placed in a vertical position and the center as well as the edge portion of the tread completely removed. In the design here illustrated, the drilling apparatus with which the means of my invention is associated, will not ordinarily permit of the tire being swung in both directions so as to effect complete removal of the entire tread. For this reason also instead of providing the trunnion with a set of the arms 62 for each side of the tire, but one set is provided. However, with this arrangement, after the tread has been removed from one side, the remaining portion may be removed by simply reversing the tire on the trunnion and then proceed as in initiating the cutting operation, to cut the edge of the tread with the tire in the oblique position and then successively straightening the tire until the entire tread is removed.

In Figures 7 and 8 I have shown a modified form of the invention. In this arrangement it is contemplated to leave the tire in one position, that is not to change its angular relation with respect to the cutter at any time during the tread removing operation. On the other hand, the cutter head is the element which is designed to have its angular relationship varied with respect to the work supporting on the successive cutting courses. Incidentally with this machine, the complete removal of the tread may be effected without requiring the reverse positioning of the tire on the supporting unit. As will be clear from Figure 7, the tire is arranged for support on a cross piece 71 which is removably held in a frame 72, the piece 71 being provided with one or more rollers similar to the ones 59 used on the device first described, and on which the tire may be supported in like manner. For the support and operation of the cutter, I provide a self contained power unit mounted in a carriage or frame 73 which is adjustably positioned in fixed guides 74, the latter and the carriage being so designed that the power unit together with the cutter may be swung about the center of the roller 59 to assume any angular position with respect to the tire. It is to be noted that the center of the roller in this instance, as well as in the first described embodiment is approximately coincident with the center of the tire casing walls in transverse section, and in this manner a minimum radial adjustment of the cutter will be required once the parts are in operative relation. The motive power for the actuation of the cutter is in this case in the form of an electric motor 76 which is mounted in the carriage with the axis of its shaft 77 radially disposed in the arcuate guide frame. Actual support and retention of the motor in the carriage and against rotational displacement about its axis, is afforded through means of shaft sections 78 and 79 respectively disposed at the inner and outer ends of the motor. The inner section 78 is arranged to be held fixed to the motor housing against rotational displacement with respect thereto and it provides the member, in place of the quill in the drill press, to which the blade holder is attached. Section 78 is formed hollow and has extended therethrough the end of the motor shaft designed for attachment to the eccentric of the cutter reciprocating means. The other shaft section 79 is likewise connected to the motor housing and has preferably provided thereon threads 81 which engage in a nut 82 rotatable in the carriage. By means of a handle wheel 83 secured to the nut 82, the latter may be rotated to cause the motor and the shaft extensions, and consequently the cutter unit, to be moved axially and thus in different radial positions with respect to the tire casing center aforesaid. Retention of the carriage in any of its different arcuate positions may be effected in any suitable manner, but as here shown this is accomplished by means of a set-screw 84 which serves to simply clamp the carriage to the guide frame.

If desired, the apparatus may be provided with means for revolving the tire when the latter is operatively positioned therein. Such a means is here shown in connection with the last described embodiment for the purpose of illustration, and comprises in general a roller 86 positioned to extend transversely across and engage the tread of the tire just in advance of the cutting edge of the blade. The roller is fixed on a shaft 87 mounted in a frame 88 formed of adjustably connected portions so as to permit vertical adjustment of the roller. For driving the roller shaft 87 there is provided a chain of gears 88, 89, 90 and 91, the latter of which is fixed to the motor shaft, and in order to permit the aforesaid vertical adjustment of the roller shaft a vertical shaft 92 on which two of the gears are mounted is provided with a slip joint 93. Preferably the supporting portions 94 for the roller shaft are spring pressed so that the roller will be resiliently held in engagement with the tire.

I claim:

1. In a trimmer apparatus, a cutter unit comprising in combination with a rotatable driving element and a fixed element, a holder secured to said fixed element, a slide mounted to reciprocate transversely of the axis of rotation of the driving element, a blade secured to the slide for reciprocation therewith, means in said holder providing a bearing and guide for the slide in its reciprocative movement and being rotatable in the housing about an axis parallel to the line of movement of the slide, means to lock said means in different rotative positions in the holder to thereby retain the blade in different angular relations with respect to the work, an eccentric carried by said driving element, a ring strap surrounding and operatively engaging said eccentric and slide to effect reciprocation of the latter on rotation of said element.

2. A trimmer apparatus comprising a work supporting unit, a cutter unit including a rotatable element and a non-rotatable element both adjustable to and from said supporting unit, and on an arc about same, a blade having reciprocating driving connections with said rotatable element, and a guide for said blade secured to said non-rotatable element.

3. A trimmer apparatus for tires and the like arranged for use with a tire supporting unit arranged to permit rotation of the tire to advance the tread thereof to the trimmer apparatus comprising, a cutter unit having a cutter blade, a roller positioned to resiliently engage the tire tread immediately in advance of the cutter blade, and both the cutter blade and roller being adjustable to and from the tire, said roller being resiliently pressed to a position ahead of said blade to automatically engage the tire before the blade whereby rotation of the tire may be effected in advance of the engagement of the blade with the tire.

4. A tire trimmer apparatus, comprising an arched support, an electric motor slidably mounted on said support for angularly displacing the axis of said motor, a cutter unit carried and driven by said motor and movable therewith in a generally curved path for engagement over the transverse periphery of a tire, and means for adjusting said motor and unit radially of said support.

5. A tire trimmer comprising, a pair of substantially concentric ring supports, a member secured to and adjustable around said supports, an electric motor carried by said member with the axis of the motor generally radially of said supports, means for adjusting said motor on said member for positioning the motor radially of said supports, and a cutter unit secured to and driven by said motor and movable therewith through a curved path for engaging the periphery of a tire.

6. A tire trimmer comprising, a pair of substantially concentric ring supports, a frame secured to and angularly displaceable on said supports, an electric motor carried by said frame with the axis of the motor generally radially of said supports, an axially extending adjusting screw on said motor supported by said frame, means engaging said screw for positioning the motor radially of said supports, and a cutter unit secured to and driven by said motor and movable therewith through a curved path for engaging the periphery of a tire.

EDWIN D. BROWNING.